(12) United States Patent
Suehiro

(10) Patent No.: US 12,276,980 B2
(45) Date of Patent: Apr. 15, 2025

(54) REMOTE OPERATION SYSTEM AND ABNORMALITY NOTIFICATION METHOD

(71) Applicant: TOYOTA JIDOSHA KABUSHIKI KAISHA, Toyota (JP)

(72) Inventor: Yuki Suehiro, Ichikawa (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 197 days.

(21) Appl. No.: 18/065,927

(22) Filed: Dec. 14, 2022

(65) Prior Publication Data
US 2023/0259130 A1 Aug. 17, 2023

(30) Foreign Application Priority Data
Feb. 14, 2022 (JP) ................................. 2022-020821

(51) Int. Cl.
*G05D 1/00* (2024.01)
(52) U.S. Cl.
CPC ......... *G05D 1/0077* (2013.01); *G05D 1/0022* (2013.01)
(58) Field of Classification Search
CPC ........ G05D 1/005; G05D 1/221; G05D 1/222; G05D 1/224; G05D 1/2242; G05D 1/226
See application file for complete search history.

(56) References Cited

U.S. PATENT DOCUMENTS

| 2017/0293295 A1 | 10/2017 | Tani |
| 2019/0109754 A1* | 4/2019 | Park ...................... G06F 3/0338 |
| 2022/0242421 A1 | 8/2022 | Akatsuka et al. |
| 2022/0242447 A1 | 8/2022 | Nagura et al. |

FOREIGN PATENT DOCUMENTS

| JP | 2004-295360 A | 10/2004 |
| JP | 2004-359000 A | 12/2004 |
| JP | 2013-020426 A | 1/2013 |
| JP | 2016-071585 A | 5/2016 |
| JP | 2021-11233 A | 2/2021 |
| JP | 2021-068132 A | 4/2021 |
| JP | 2022-119598 A | 8/2022 |

* cited by examiner

*Primary Examiner* — Aaron L Troost
(74) *Attorney, Agent, or Firm* — Sughrue Mion, PLLC

(57) ABSTRACT

A remote operation system includes a moving body is a target of a remote operation performed by a remote operator and a remote operator terminal on the remote operator side. The remote operation system determines whether at least one of an abnormality in a communication between the moving body and the remote operator terminal, an abnormality in the moving body, and an abnormality in the remote operator terminal occurs. The remote operation system sets a gain to be larger when the abnormality occurs than when no abnormality occurs. The remote operation system calculates a reaction force control amount by multiplying a base reaction force control amount by the gain. The remote operator terminal applies an operation reaction force according to the reaction force control amount to a remote operation member operated by the remote operator.

7 Claims, 14 Drawing Sheets

REMOTE OPERATION SYSTEM AND ABNORMALITY NOTIFICATION METHOD

CROSS-REFERENCE TO RELATED APPLICATION

This application claims priority to Japanese Patent Application No. 2022-020821 filed on Feb. 14, 2022, the entire contents of which are incorporated by reference herein.

BACKGROUND

Technical Field

The present disclosure relates to a remote operation of a moving body performed by a remote operator.

Background Art

Patent Literature 1 discloses a driving control system for remotely controlling a vehicle. A remote operation device and a driving control device on the vehicle side perform wireless communication. The driving control device calculates a delay time of the wireless communication with the remote operation device. When the delay time is equal to or longer than a threshold, the driving control device changes driving control of the vehicle from normal control to safety control. For example, the safety control decreases the vehicle speed as compared with the case of the normal control.

In addition, techniques related to a remote operation of a vehicle are disclosed in Patent Literature 2, Patent Literature 3, and Patent Literature 4.

LIST OF RELATED ART

Patent Literature 1: Japanese Laid-Open Patent Application No. JP-2016-071585
Patent Literature 2: Japanese Laid-Open Patent Application No. JP-2004-295360
Patent Literature 3: Japanese Laid-Open Patent Application No. JP-2013-020426
Patent Literature 4: Japanese Laid-Open Patent Application No. JP-2021-068132

SUMMARY

A remote operation of a moving body (e.g., a vehicle, a robot) performed by a remote operator is considered. A remote operation system includes a moving body being a target of the remote operation and a remote operator terminal on the remote operator side. During the remote operation, the moving body and the remote operator terminal communicate with each other. When an abnormality occurs in such the remote operation system, it is desirable to effectively notify the remote operator of the occurrence of the abnormality.

An object of the present disclosure is to provide a technique capable of effectively notifying a remote operator of occurrence of an abnormality when the abnormality occurs in a remote operation system.

A first aspect is directed to a remote operation system.
The remote operation system includes:
a moving body being a target of a remote operation performed by a remote operator;
a remote operator terminal on a side of the remote operator; and
one or more processors included in at least one of the moving body and the remote operator terminal.
The one or more processors are configured to:
execute an abnormality determination process that determines whether or not at least one of an abnormality in a communication between the moving body and the remote operator terminal, an abnormality in the moving body, and an abnormality in the remote operator terminal occurs;
execute a gain setting process that sets a gain to be larger when the abnormality occurs than when no abnormality occurs; and
calculate a reaction force control amount by multiplying a base reaction force control amount by the gain.
The remote operator terminal is configured to apply an operation reaction force according to the reaction force control amount to a remote operation member operated by the remote operator.

A second aspect is directed an abnormality notification method in a remote operation system.
The remote operation system includes: a moving body being a target of a remote operation performed by a remote operator; and a remote operator terminal on a side of the remote operator.
The abnormality notification method includes:
an abnormality determination process that determines whether or not at least one of an abnormality in a communication between the moving body and the remote operator terminal, an abnormality in the moving body, and an abnormality in the remote operator terminal occurs;
a gain setting process that sets a gain to be larger when the abnormality occurs than when no abnormality occurs;
calculating a reaction force control amount by multiplying a base reaction force control amount by the gain; and
applying an operation reaction force according to the reaction force control amount to a remote operation member operated by the remote operator.

According to the present disclosure, it is determined whether or not an abnormality occurs in the remote operation system. When the abnormality occurs, the operation reaction force felt by the remote operator becomes larger than that in the normal state. Thus, the remote operator is able to easily recognize the occurrence of the abnormality. That is, it is possible to effectively notify the remote operator of the occurrence of the abnormality in the remote operation system.

EMBODIMENTS

Embodiments of the present disclosure will be described with reference to the accompanying drawings.

1. Overview of Remote Operation System

A remote operation (remote driving) of a moving body is considered. Examples of the moving body being a target of the remote operation include a vehicle, a robot, a flying object, and the like. The vehicle may be an autonomous driving vehicle or may be a vehicle driven by a driver. Examples of the robot include a logistics robot, a work robot, and the like. Examples of the flying object include an airplane, a drone, and the like.

As an example, in the following description, a case where the moving body being the target of the remote operation is a vehicle will be considered. When generalizing, "vehicle" in the following description shall be deemed to be replaced with "moving body."

Figure 1:
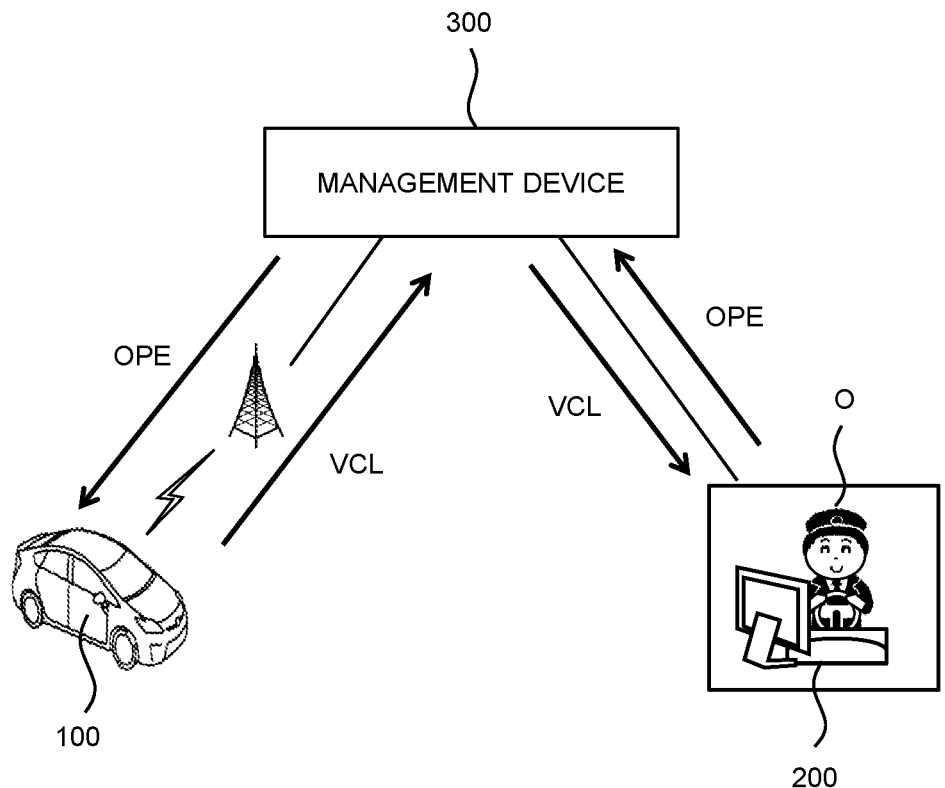
FIG. 1 is a schematic diagram showing a configuration example of a remote operation system according to an embodiment of the present disclosure.

FIG. 1 is a schematic diagram showing a configuration example of a remote operation system 1 according to the present embodiment. The remote operation system 1 includes a vehicle 100, a remote operator terminal 200, and a management device 300. The vehicle 100 is the target of the remote operation. The remote operator terminal 200 is a terminal device used by a remote operator O when remotely operating the vehicle 100. The remote operator terminal 200 can also be referred to as a remote operation human machine interface (HMI). The management device 300 manages the remote operation system 1. The management of the remote operation system 1 includes, for example, assigning a remote operator O to a vehicle 100 that requires the remote operation. The management device 300 is able to communicate with the vehicle 100 and the remote operator terminal 200 via a communication network. Typically, the management device 300 is a management server on a cloud. The management server may be configured by a plurality of servers that perform distributed processing.

Various sensors including a camera are installed on the vehicle 100. The camera images a situation around the vehicle 100 to acquire image information indicating the situation around the vehicle 100. Vehicle information VCL is information acquired by the various sensors and includes the image information captured by the camera. The vehicle 100 transmits the vehicle information VCL to the remote operator terminal 200 via the management device 300. That is, the vehicle 100 transmits the vehicle information VCL to the management device 300, and the management device 300 transfers the received vehicle information VCL to the remote operator terminal 200.

The remote operator terminal 200 receives the vehicle information VCL transmitted from the vehicle 100. The remote operator terminal 200 presents the vehicle information VCL to the remote operator O. More specifically, the remote operator terminal 200 includes a display device, and displays the image information and the like on the display device. The remote operator O views the displayed information, recognizes the situation around the vehicle 100, and performs remote operation of the vehicle 100. The remote operation information OPE is information relating to remote operation by the remote operator O. For example, the remote operation information OPE includes an amount of operation performed by the remote operator O. The remote operator terminal 200 transmits the remote operation information OPE to the vehicle 100 via the management device 300. That is, the remote operator terminal 200 transmits the remote operation information OPE to the management device 300, and the management device 300 transfers the received remote operation information OPE to the vehicle 100.

The vehicle 100 receives the remote operation information OPE transmitted from the remote operator terminal 200. The vehicle 100 performs vehicle travel control in accordance with the received remote operation information OPE. In this manner, the remote operation of the vehicle 100 is realized.

2. Abnormality Determination Process and Abnormality Notification Process

Next, an "abnormality" that may occur in the remote operation system 1 will be considered. The abnormality is a concept including failure, malfunction, insufficiency, and trouble. Examples of the abnormality in the remote operation system 1 include a "communication abnormality" that is an abnormality in the communication between the vehicle 100 and the remote operator terminal 200, a "vehicle abnormality" that is an abnormality in the vehicle 100, and a "terminal abnormality" that is an abnormality in the remote operator terminal 200.

The remote operation system 1 executes an "abnormality determination process" that determines whether or not at least one of the communication abnormality, the vehicle abnormality, and the terminal abnormality occurs in the remote operation system 1. When the abnormality occurs during the remote operation of the vehicle 100, it is desirable to make a quick response in order to secure safety. To that end, when the abnormality occurs, the remote operation system 1 executes an "abnormality notification process" that notifies the remote operator O of the occurrence of the abnormality.

Figure 2:
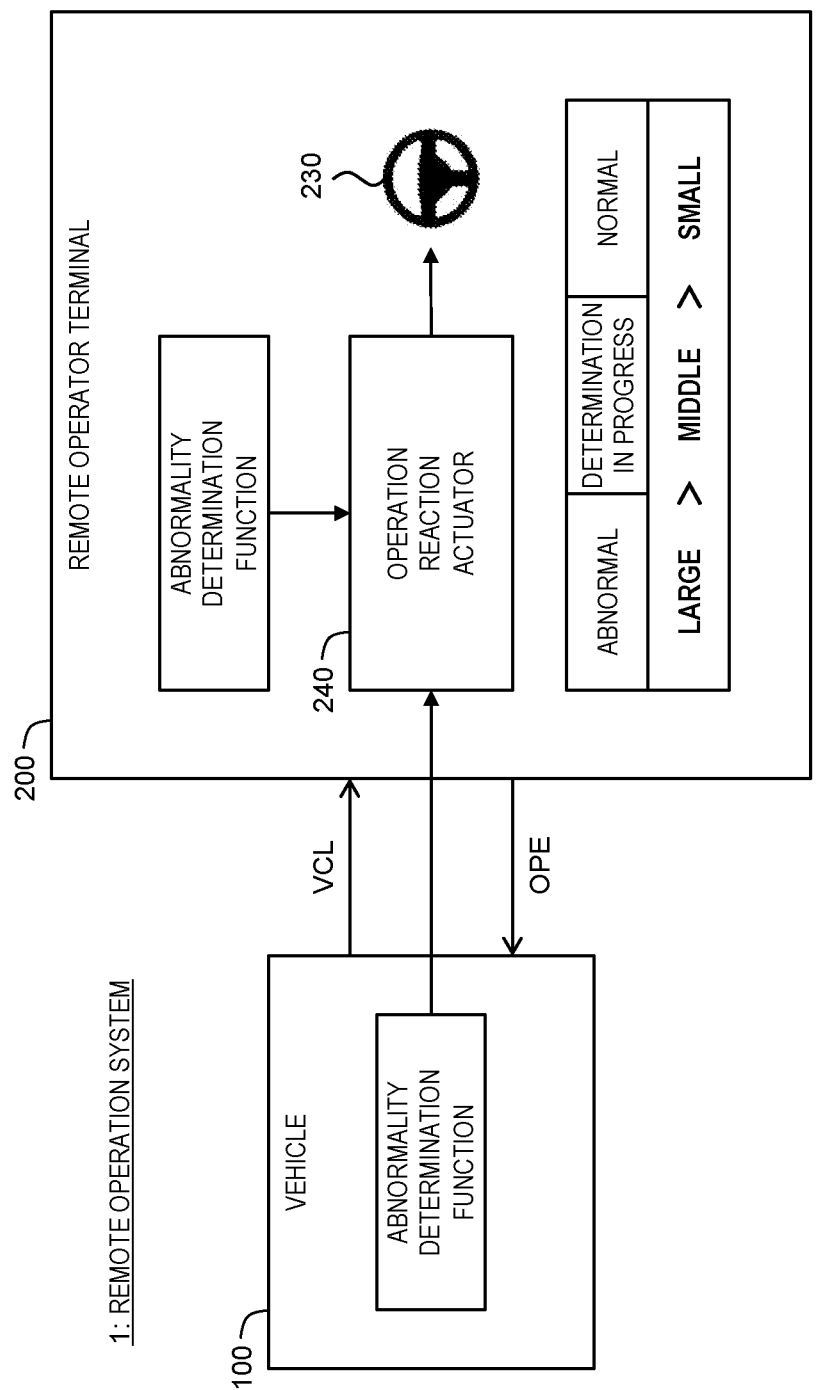
FIG. 2 is a conceptual diagram for explaining an overview of an abnormality determination process and an abnormality notification process according to an embodiment of the present disclosure.

FIG. 2 is a conceptual diagram for explaining an overview of the abnormality determination process and the abnormality notification process according to the present embodiment. At least one of the vehicle 100 and the remote operator terminal 200 executes the abnormality determination process.

For example, the vehicle 100 may have a "communication abnormality determination function" that determines whether or not the communication abnormality occurs. More specifically, the vehicle 100 communicates with the remote operator terminal 200 to receive information such as the remote operation information OPE from the remote operator terminal 200. Based on the received information, it is possible to grasp a state of the communication with the remote operator terminal 200. Based on the communication state, the vehicle 100 can determine whether or not an abnormality occurs in the communication from the remote operator terminal 200 to the vehicle 100.

As another example, the vehicle 100 may have a "vehicle abnormality determination function" that determines whether or not the vehicle abnormality occurs.

As still another example, the remote operator terminal 200 may have a "communication abnormality determination function" that determines whether or not the communication abnormality occurs. More specifically, the remote operator terminal 200 communicates with the vehicle 100 to receive information such as the vehicle information VCL from the vehicle 100. Based on the received information, it is possible to grasp a state of the communication with the vehicle 100. Based on the communication state, the remote operator terminal 200 can determine whether or not an abnormality occurs in the communication from the vehicle 100 to the remote operator terminal 200.

As still another example, the remote operator terminal 200 may have a "terminal abnormality determination function" that determines whether or not the terminal abnormality occurs.

An abnormality notification process for notifying the remote operator O of the occurrence of the abnormality is performed through an "operation reaction force." More specifically, the remote operator terminal 200 includes a remote operation member 230 and an operation reaction actuator 240. The remote operation member 230 is a member operated by the remote operator O when remotely operating the vehicle 100. The remote operation member 230 includes a steering wheel, an accelerator pedal, a brake pedal, a direction indicator, and the like. The operation reaction actuator 240 applies the operation reaction force to the remote operation member 230. For example, the operation reaction force is a steering reaction force applied to the steering wheel. The remote operator O operating the remote operation member 230 feels the operation reaction force applied to the remote operation member 230.

The remote operator terminal 200 controls (adjusts) magnitude of the operation reaction force applied to the remote operation member 230 according to a result of the abnormality determination process. More specifically, when compared under a condition that a vehicle state such as a steering angle and a vehicle speed of the vehicle 100 is the same, the operation reaction force in the case of the occurrence of the abnormality is controlled (adjusted) to be larger than that in the case of the normal state. That is, when the abnormality occurs, the operation reaction force felt by the remote operator O becomes larger than that in the case of the normal state. Thus, the remote operator O is able to easily recognize the occurrence of the abnormality. That is, it is possible to effectively notify the remote operator O of the occurrence of the abnormality in the remote operation system 1.

In the abnormality determination process, there may be a case where the occurrence of the abnormality is not yet determined but possibility (sign) of the occurrence of the abnormality is detected. A period of "determination in progress" is a period from when possibility of the occurrence of the abnormality is detected to when whether or not the abnormality occurs is determined. During the period of determination in progress, the magnitude of the operation reaction force may be controlled (adjusted) to be between that in the case of the occurrence of the abnormality and that in the case of the normal state. This makes it possible to more finely perform the notification to the remote operator O.

Figure 3:
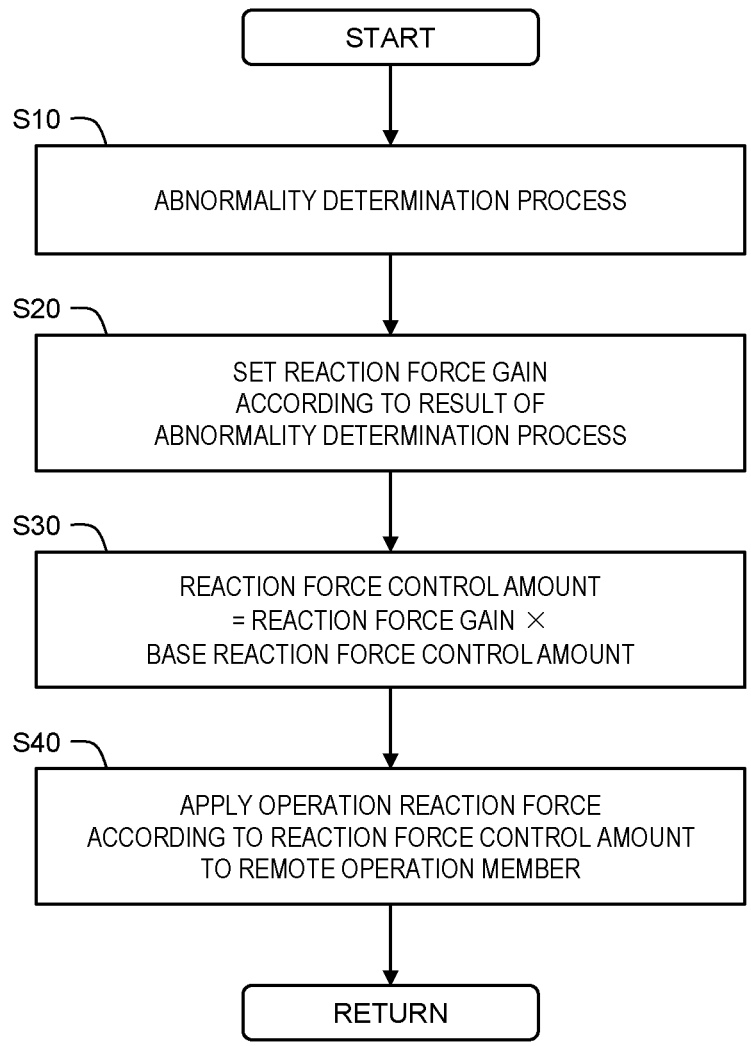
FIG. 3 is a flowchart showing an overview of an abnormality determination process and an abnormality notification process according to an embodiment of the present disclosure.

FIG. 3 is a flowchart showing an overview of the abnormality determination process and the abnormality notification process according to the present embodiment.

In Step S10, the remote operation system 1 executes the "abnormality determination process." More specifically, the remote operation system 1 determines whether or not at least one of the communication abnormality, the vehicle abnormality, and the terminal abnormality occurs in the remote operation system 1.

In Step S20, the remote operation system 1 executes a "gain setting process" that sets a reaction force gain Gr according to the result of the abnormality determination process. More specifically, when it is determined that no abnormality occurs, the remote operation system 1 sets the reaction force gain Gr to a first gain. On the other hand, when it is determined that the abnormality occurs, the remote operation system 1 sets the reaction force gain Gr to a second gain larger than the first gain. In a period from when the possibility of the occurrence of the abnormality is detected to when whether or not the abnormality occurs is determined, the remote operation system 1 may set the reaction force gain Gr to a third gain between the first gain and the second gain.

In Step S30, the remote operation system 1 executes a "reaction force control amount calculation process" that calculates a reaction force control amount FB for generating the operation reaction force. More specifically, the remote operation system 1 calculates the reaction force control amount FB by multiplying a base reaction force control amount FB0 by the reaction force gain Gr. The base reaction force control amount FB0 is calculated based on the vehicle state such as the steering angle and the vehicle speed of the vehicle 100. When compared under a condition that the base reaction force control amount FB0 is the same, the reaction force control amount FB in the case of the occurrence of the abnormality becomes larger than the reaction force control amount FB in the case of the normal state.

In Step S40, the remote operator terminal 200 controls the reaction actuator 240 in accordance with the reaction force control amounts FB to apply the operation reaction force according to the reaction force control amounts FB to the remote operation member 230.

Effects

As described above, according to the present embodiment, it is determined whether or not an abnormality occurs in the remote operation system 1. When the abnormality occurs, the operation reaction force felt by the remote operator O becomes larger than that in the normal state. Thus, the remote operator O is able to easily recognize the occurrence of the abnormality. That is, it is possible to effectively notify the remote operator O of the occurrence of the abnormality in the remote operation system 1.

The remote operator O recognizing the occurrence of the abnormality can take measures for securing safety. For example, the remote operator O is able to make the vehicle 100 evacuate and stop at a safe position.

In a period until whether or not the abnormality occurs is determined, the magnitude of the operation reaction force may be controlled to be between that in the case of the occurrence of the abnormality and that in the case of the normal state. This makes it possible to more finely perform the notification to the remote operator O.

The operation reaction force may be a steering reaction force applied to the steering wheel. In this case, the steering reaction force increases when the abnormality occurs. Since the steering reaction force increases, excessive steering is suppressed. As a result, for example, meandering driving of the vehicle 100 caused by the remote operation is suppressed. That is, stability of the vehicle 100 in the case of the occurrence of the abnormality is improved. It is possible to remotely operate the vehicle 100 more safely when the abnormality occurs.

Hereinafter, the remote operation system 1 according to the present embodiment will be described in more detail.

3. Example of Vehicle 3-1. Configuration Example

Figure 4:
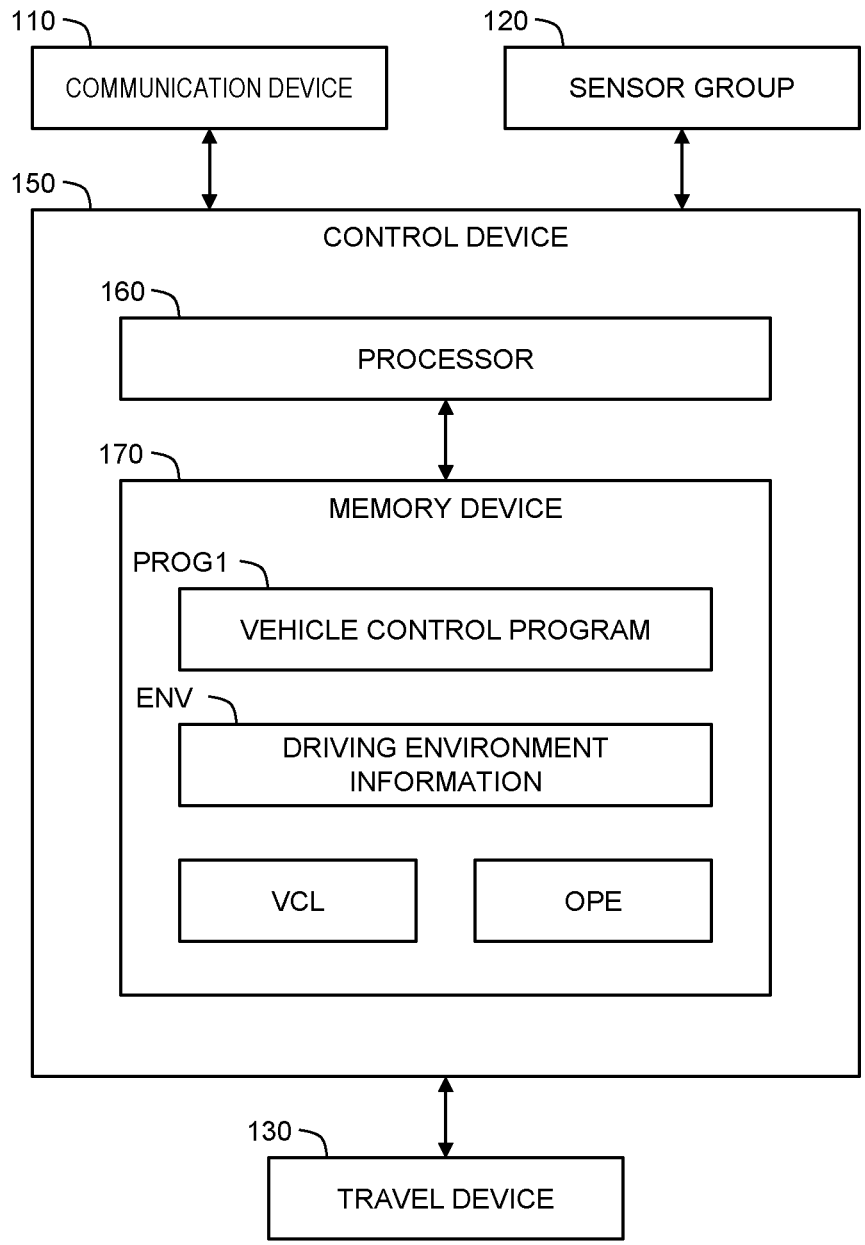
FIG. 4 is a block diagram showing a configuration example of a vehicle according to an embodiment of the present disclosure.

FIG. 4 is a block diagram showing a configuration example of the vehicle 100. The vehicle 100 includes a communication device 110, a sensor group 120, a travel device 130, and a control device (controller) 150.

The communication device 110 communicates with the outside of the vehicle 10. For example, the communication device 110 communicates with the remote operator terminal 200 and the management device 300.

The sensor group 120 includes a recognition sensor, a vehicle state sensor, a position sensor, and the like. The recognition sensor recognizes (detects) a situation around the vehicle 100. Examples of the recognition sensor include the camera, a laser imaging detection and ranging (LIDAR), a radar, and the like. The vehicle state sensor detects a state of the vehicle 100. Examples of the vehicle state sensor include a speed sensor, an acceleration sensor, a yaw rate sensor, a steering angle sensor, and the like. The position sensor detects a position and an orientation of the vehicle 10. For example, the position sensor includes a global navigation satellite system (GNSS).

The travel device 130 includes a steering device, a driving device, and a braking device. The steering device turns wheels. For example, the steering device includes an electric power steering (EPS) device. The driving device is a power source that generates a driving force. Examples of the drive device include an engine, an electric motor, an in-wheel motor, and the like. The braking device generates a braking force.

The control device 150 is a computer that controls the vehicle 10. The control device 150 includes one or more processors 160 (hereinafter simply referred to as a processor 160) and one or more memory devices 170 (hereinafter simply referred to as a memory device 170). The processor 160 executes a variety of processing. For example, the processor 160 includes a central processing unit (CPU). The memory device 170 stores a variety of information necessary for the processing by the processor 160. Examples of the memory device 170 include a volatile memory, a non-volatile memory, a hard disk drive (HDD), a solid state drive (SSD), and the like. The control device 150 may include one or more electronic control units (ECUs).

A vehicle control program PROG1 is a computer program executed by the processor 160. The functions of the control device 150 are implemented by the processor 160 executing the vehicle control program PROG1. The vehicle control program PROG1 is stored in the memory device 170. The vehicle control program PROG1 may be recorded on a non-transitory computer-readable recording medium.

3-2. Driving Environment Information

The control device 150 uses the sensor group 120 to acquire driving environment information ENV indicating a driving environment for the vehicle 100. The driving environment information ENV is stored in the memory device 170.

The driving environment information ENV includes surrounding situation information indicating a result of recognition by the recognition sensor. For example, the surrounding situation information includes the image information captured by the camera. The surrounding situation information further includes object information regarding an object around the vehicle 10. Examples of the object around the vehicle 100 include a pedestrian, another vehicle (e.g., a preceding vehicle, a parked vehicle, etc.), a white line, a traffic signal, a sign, a roadside structure, and the like. The object information indicates a relative position and a relative velocity of the object with respect to the vehicle 10.

In addition, the driving environment information ENV includes vehicle state information indicating the vehicle state detected by the vehicle state sensor.

Furthermore, the driving environment information ENV includes vehicle position information indicating the position and the orientation of the vehicle 100. The vehicle position information is acquired by the position sensor. Highly accurate vehicle position information may be acquired by performing a well-known localization using map information and the surrounding situation information (the object information).

3-3. Vehicle Travel Control

The control device 150 executes vehicle travel control that controls travel of the vehicle 100. The vehicle travel control includes steering control, driving control, and braking control. The control device 150 executes the vehicle travel control by controlling the travel device 130 (i.e., the steering device, the driving device, and the braking device).

The control device 150 may execute autonomous driving control based on the driving environment information ENV. More specifically, the control device 150 generates a travel plan of the vehicle 100 based on the driving environment information ENV. Further, the control device 150 generates, based on the driving environment information ENV, a target trajectory required for the vehicle 100 to travel in accordance with the travel plan. The target trajectory includes a target position and a target speed. Then, the control device 150 executes the vehicle travel control such that the vehicle 100 follows the target trajectory.

3-4. Processing Related to Remote Operation

Hereinafter, the case where the remote operation of the vehicle 100 is performed will be described. The control device 150 communicates with the remote operator terminal 200 via the communication device 110.

The control device 150 transmits the vehicle information VCL to the remote operator terminal 200. The vehicle information VCL is information necessary for the remote operation by the remote operator O, and includes at least a part of the driving environment information ENV described above. For example, the vehicle information VCL includes the surrounding situation information (especially, the image information). The vehicle information VCL may further include the vehicle state information and the vehicle position information.

In addition, the control device 150 receives the remote operation information OPE from the remote operator terminal 200. The remote operation information OPE is information regarding the remote operation by the remote operator O. For example, the remote operation information OPE includes an amount of operation performed by the remote operator O. The control device 150 performs the vehicle travel control in accordance with the received remote operation information OPE.

3-4-1. Abnormality Determination Process and Abnormality Notification Process

Figure 5:
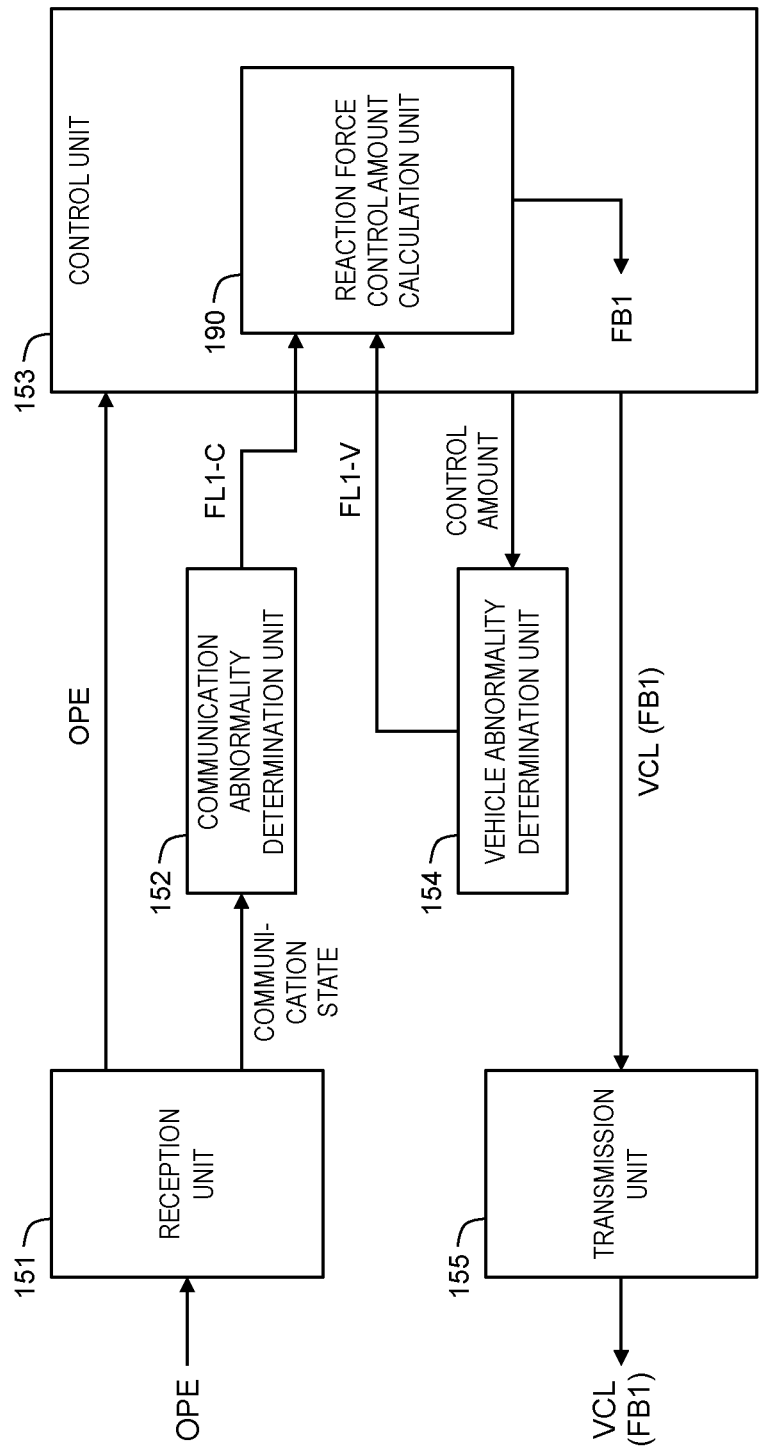
FIG. 5 is a block diagram for explaining an abnormality determination process and an abnormality notification process in a vehicle according to an embodiment of the present disclosure.

FIG. 5 is a block diagram for explaining the abnormality determination process and the abnormality notification process in the vehicle 100. The vehicle 100 includes, as functional blocks, a reception unit 151, a communication abnormality determination unit 152, a control unit 153, a vehicle abnormality determination unit 154, and a transmission unit 155. These functional blocks are realized by the communication device 110 and the control device 150.

The reception unit 151 receives information transmitted from the remote operator terminal 200 during the remote operation of the vehicle 100. The information transmitted from the remote operator terminal 200 includes the remote operation information OPE described above. The reception unit 151 grasps a state of the communication with the remote operator terminal 200 based on the received information. Examples of the communication state include presence or absence of data reception, a delay amount, a transmission speed, a radio wave reception intensity, and the like.

The communication abnormality determination unit 152 performs a "communication abnormality determination process." More specifically, the communication abnormality determination unit 152 acquires information on the communication state from the reception unit 151. Then, the communication abnormality determination unit 152 determines, based on the communication state, whether or not an abnormality occurs in the communication from the remote operator terminal 200 to the vehicle 100. A specific example of the communication abnormality determination process will be described later (see Section 3-4-2).

A communication abnormality flag FL1-C is information indicating a result of the communication abnormality determination process. When it is determined that no communication abnormality occurs, that is, when no communication abnormality is detected, the communication abnormality flag FL1-C is set to, for example, "0." On the other hand, when it is determined that a communication abnormality occurs, that is, when a communication abnormality is detected, the communication abnormality flag FL1-C is set to, for example, "1." The communication abnormality determination unit 152 outputs the communication abnormality flag FL1-C.

The control unit 153 receives the remote operation information OPE and the abnormality flag (FL1-C, FL1-V). The control unit 153 performs the vehicle travel control in accordance with the remote operation information OPE. Moreover, the control unit 153 outputs the vehicle information VCL. Further, when the abnormality flag indicates the abnormality detection, the control unit 153 may perform a predetermined abnormality handling process (e.g., evacuation control).

The vehicle abnormality determination unit 154 performs a "vehicle abnormality determination process." More specifically, the vehicle abnormality determination unit 154 receives information on a vehicle travel control amount calculated by the control unit 153. Then, the vehicle abnormality determination unit 154 determines, based on the vehicle travel control amount, whether or not an abnormality occurs in the vehicle travel control. A specific example of the vehicle abnormality determination process will be described later (see Section 3-4-3).

A vehicle abnormality flag FL1-V is information indicating a result of the vehicle abnormality determination process. When it is determined that no vehicle abnormality occurs, that is, when the vehicle abnormality is not detected, the vehicle abnormality flag FL1-V is set to, for example, "0." On the other hand, when it is determined that a vehicle abnormality occurs, that is, when a vehicle abnormality is detected, the vehicle abnormality flag FL1-V is set to, for example, "1." The vehicle abnormality determination unit 154 outputs the vehicle abnormality flag FL1-V.

The transmission unit 155 transmits the vehicle information VCL output from the control unit 153 to the remote operator terminal 200.

3-4-2. Example of Communication Abnormality Determination Process

Figure 6:
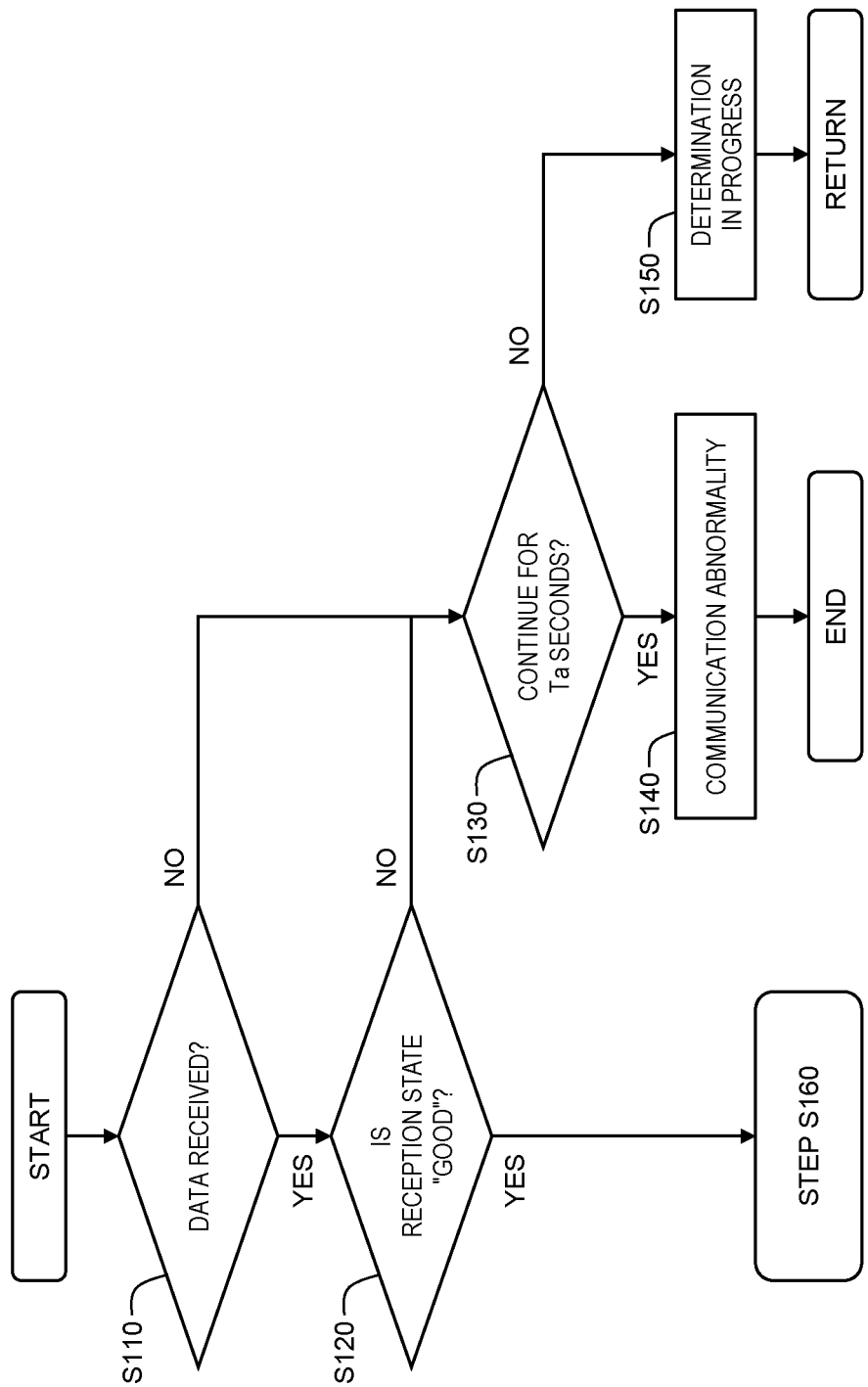
FIG. 6 is a flowchart showing an example of a communication abnormality determination process according to an embodiment of the present disclosure.

FIG. 6 is a flowchart showing an example of the communication abnormality determination process performed by the communication abnormality determination unit 152.

In Step S110, the communication abnormality determination unit 152 determines whether or not the reception unit 151 receives data. When the reception unit 151 receives data (Step S110; Yes), the processing proceeds to Step S120. Otherwise (Step S110; No), the processing proceeds to Step S130.

In Step S120, the communication abnormality determination unit 152 determines whether a reception state is good or not. The reception state is represented by a parameter such as the transmission speed, the radio wave reception intensity, and the like. When the parameter is equal to or greater than a predetermined threshold (Step S120; Yes), it is determined that the reception state is good, and the processing proceeds to Step S160. Otherwise (Step S120; No), the processing proceeds to Step S130.

In Step S130, the communication abnormality determination unit 152 determines whether or not the non-data reception state or the not-good reception state continues for Ta seconds. When such the bad state continues for Ta seconds (Step S130; Yes), the processing proceeds to Step S140. On the other hand, when such the bad state has not yet continued for Ta seconds (Step S130; No), the processing proceeds to Step S150.

In Step S140, the communication abnormality determination unit 152 determines (asserts) that the communication abnormality occurs.

In Step S150, the communication abnormality determination unit 152 sets a current state to "communication abnormality determination in progress" without confirming the determination. After that, the processing returns to Step S110.

Figure 7:
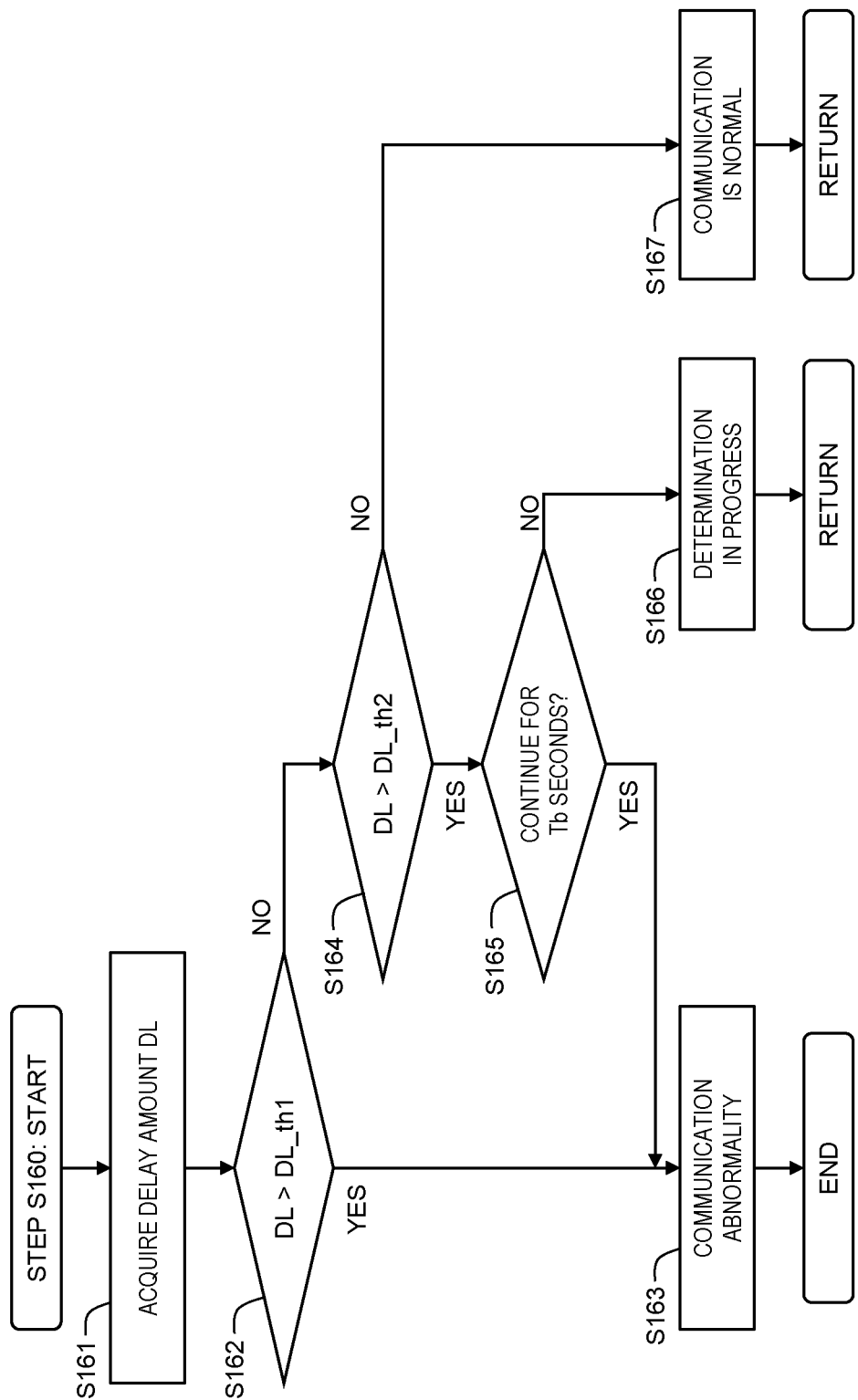
FIG. 7 is a flowchart showing an example of a communication abnormality determination process according to an embodiment of the present disclosure.

FIG. 7 is a flowchart showing an example of Step S160. In Step S160, a delay amount DL of the communication is taken into consideration.

In Step S161, the communication abnormality determination unit 152 acquires information on the delay amount DL of the communication from the reception unit 151.

In Step S162, the communication abnormality determination unit 152 determines whether or not the delay amount DL exceeds a first threshold value DL_th1. The first threshold value DL_th1 is a delay amount DL where it can be determined that the communication abnormality occurs. For example, the first threshold value DL_th1 is a delay amount DL that cannot normally occur. When the delay amount DL exceeds the first threshold value DL_th1 (Step S162; Yes), the processing proceeds to Step S163. On the other hand, when the delay amount DL is equal to or less than the first threshold value DL_th1 (Step S162; No), the processing proceeds to Step S164.

In Step S163, the communication abnormality determination unit 152 determines (asserts) that the communication abnormality occurs.

In Step S164, the communication abnormality determination unit 152 determines whether or not the delay amount DL exceeds a second threshold value DL_th2. The second threshold value DL_th2 is smaller than the first threshold value DL_th1 described above. For example, the second threshold value DL_th2 is an upper limit value of an allowable range of the delay amount DL. When the delay amount DL exceeds the second threshold value DL_th2 (Step S164; Yes), the processing proceeds to Step S165. On the other hand, when the delay amount DL is equal to or less than the second threshold value DL_th2 (Step S164; No), the processing proceeds to Step S167.

In Step S165, the communication abnormality determination unit 152 determines whether or not the state in which the delay amount DL exceeds the second threshold value DL_th2 continues for Tb seconds. When such the state continues for Tb seconds (Step S165; Yes), the processing proceeds to Step S163. On the other hand, when such the state has not yet continued for Tb seconds (Step S165; No), the processing proceeds to Step S166.

In Step S166, the communication abnormality determination unit 152 sets the current state to "communication abnormality determination in progress" without confirming the determination. After that, the processing returns to Step S110.

In Step S167, the communication abnormality determination unit 152 determines that no communication abnormality occurs and the communication is normal. After that, the processing returns to Step S110.

3-4-3. Example of Vehicle Abnormality Determination Process

Figure 8:
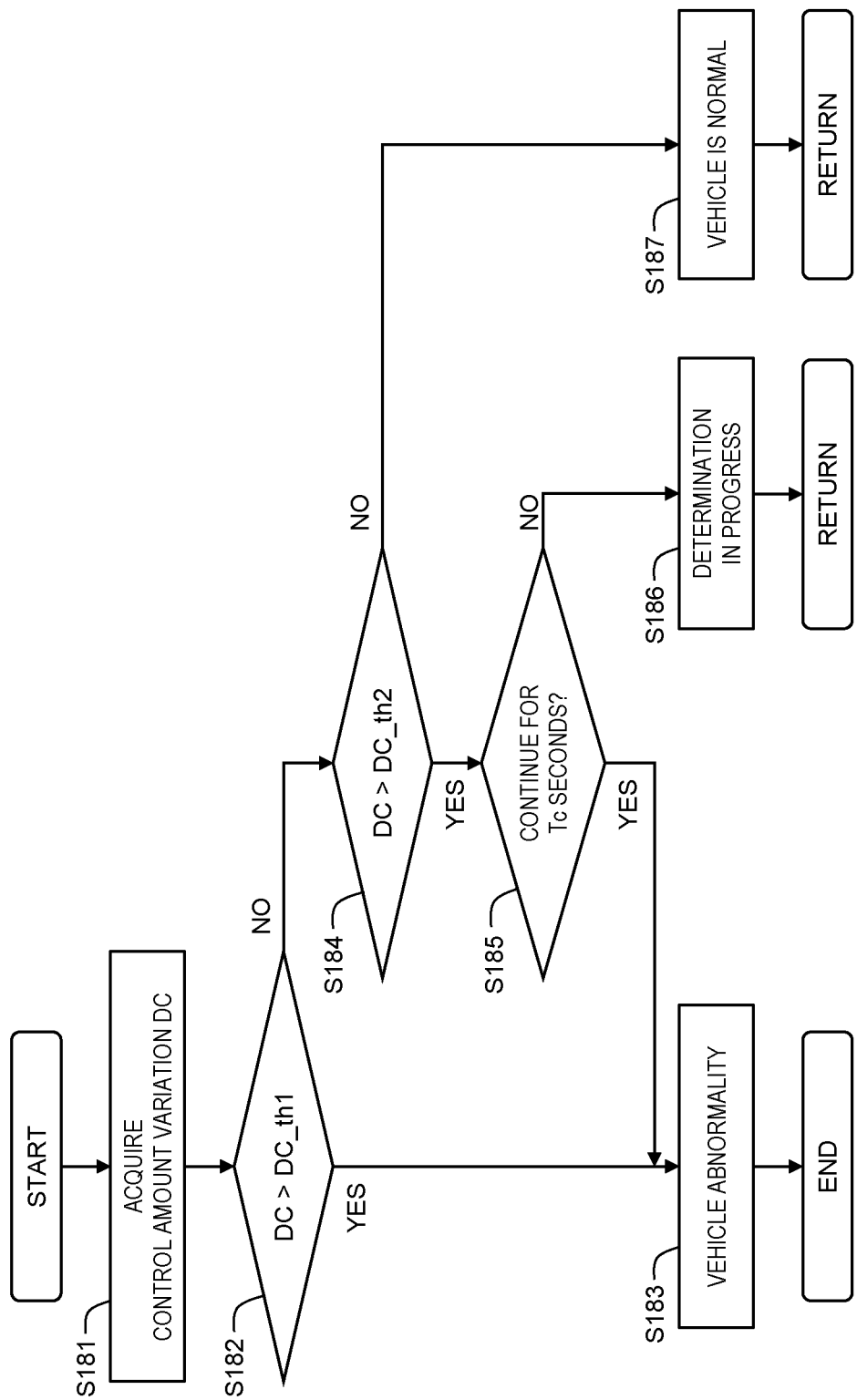
FIG. 8 is a flowchart showing an example of a vehicle abnormality determination process according to an embodiment of the present disclosure.

FIG. 8 is a flowchart showing an example of the vehicle abnormality determination process performed by the vehicle abnormality determination unit 154.

In Step S181, the vehicle abnormality determination unit 154 receives information on the vehicle travel control amount calculated by the control unit 153. Then, the vehicle abnormality determination unit 154 acquires a "control amount variation DC" that is a variation from a previous value of the vehicle travel control amount.

In Step S182, the vehicle abnormality determination unit 154 determines whether or not the control amount variation DC exceeds a first threshold value DC_th1. The first threshold value DC_th1 is a control amount variation DC where it can be determined that the vehicle abnormality occurs. For example, the first threshold value DC_th1 is a control amount variation DC that cannot normally occur. When the control amount variation DC exceeds the first threshold value DC_th1 (Step S182; Yes), the processing proceeds to Step S183. On the other hand, when the control amount variation DC is equal to or less than the first threshold value DC_th1 (Step S182; No), the processing proceeds to Step S184.

In Step S183, the vehicle abnormality determination unit 154 determines (asserts) that the vehicle abnormality occurs.

In Step S184, the vehicle abnormality determination unit 154 determines whether or not the control amount variation DC exceeds a second threshold value DC_th2. The second threshold value DC_th2 is smaller than the first threshold value DC_th1 described above. For example, the second threshold value DC_th2 is an upper limit value of an allowable range of the control amount variation DC. When the control amount variation DC exceeds the second threshold value DC_th2 (Step S184; Yes), the processing proceeds to Step S185. On the other hand, when the control amount variation DC is equal to or less than the second threshold value DC_th2 (Step S184; No), the processing proceeds to Step S187.

In Step S185, the vehicle abnormality determination unit 154 determines whether or not the state in which the control amount variation DC exceeds the second threshold value DC_th2 continues for Tc seconds. When such the state continues for Tc seconds (Step S185; Yes), the processing proceeds to Step S183. On the other hand, when such the state has not yet continued for Tc seconds (Step S185; No), the processing proceeds to Step S186.

In Step S186, the vehicle abnormality determination unit 154 sets the current state to "vehicle abnormality determination in progress" without confirming the determination. After that, the processing returns to Step S181.

In Step S187, the vehicle abnormality determination unit 154 determines that no vehicle abnormality occurs and the vehicle 100 is normal. After that, the processing returns to Step S181.

3-4-4. Example of Reaction Force Control Amount Calculation Process

As shown in the foregoing FIG. 5, the control unit 153 includes a reaction force control amount calculation unit 190. The reaction force control amount calculation unit 190 calculates a "first reaction force control amount FB1" for generating the operation reaction force in the remote operator terminal 200. The first reaction force control amount FB1 is fed back to the remote operator station 200 as a part of the vehicle information VCL.

Figure 9:
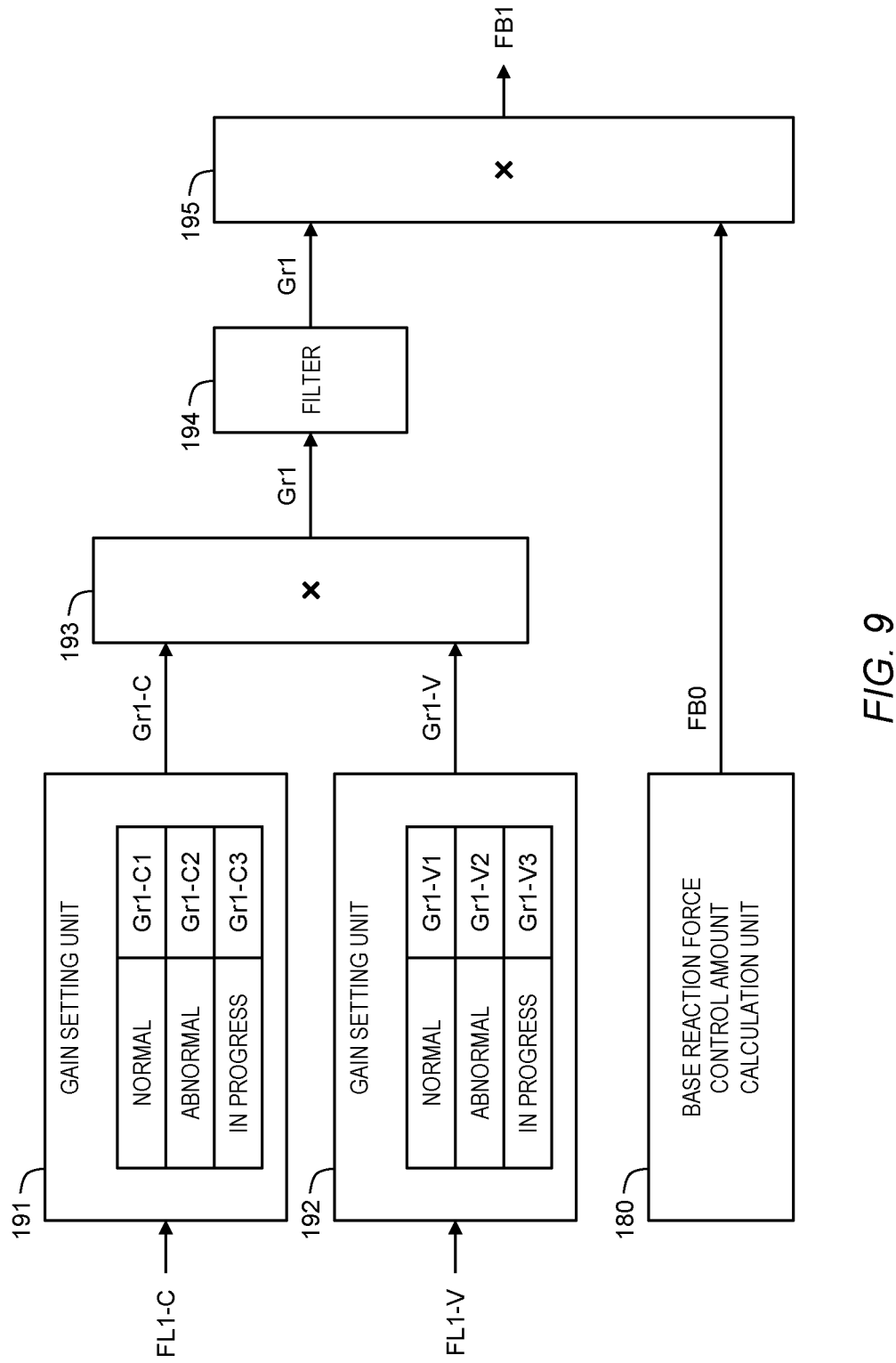
FIG. 9 is a block diagram showing a functional configuration example of a reaction force control amount calculation unit in a vehicle according to an embodiment of the present embodiment.

FIG. 9 is a block diagram showing a functional configuration example of the reaction force control amount calculation unit 190. The reaction force control amount calculation unit 190 includes a gain setting unit 191, a gain setting unit 192, a multiplication unit 193, a filtering unit 194, a multiplication unit 195, and a base reaction force control amount calculation unit 180.

The gain setting unit 191 performs a gain setting process that sets a reaction force gain Gr1-C. More specifically, the gain setting unit 191 sets the reaction force gain Gr1-C based on the communication abnormality flag FL1-C indicating the result of the communication abnormality determination process performed by the communication abnormality determination unit 152. For example, when it is determined that no communication abnormality occurs, the gain setting unit 191 sets the reaction force gain Gr1-C to a first gain Gr1-C1. When it is determined that the communication abnormality occurs, the gain setting unit 191 sets the reaction force gain Gr1-C to a second gain Gr1-C2 larger than the first gain Gr1-C1. In a period of the communication abnormality determination in progress, the gain setting unit 191 may set the reaction force gain Gr1-C to a third gain Gr1-C3 between the first gain Gr1-C1 and the second gain Gr1-C2.

The gain setting unit 192 performs a gain setting process that sets a reaction force gain Gr1-V. More specifically, gain setting unit 192 sets the reaction force gain Gr1-V based on the vehicle abnormality flag FL1-V indicating the result of the vehicle abnormality determination process performed by the vehicle abnormality determination unit 154. For example, when it is determined that no vehicle abnormality occurs, the gain setting unit 192 sets the reaction force gain Gr1-V to a first gain Gr1-V1. When it is determined that the vehicle abnormality occurs, the gain setting unit 192 sets the reaction force gain Gr1-V to a second gain Gr1-V2 larger than the first gain Gr1-V1. In a period of the vehicle abnormality determination in progress, the gain setting unit 192 may set the reaction force gain Gr1-V to a third gain Gr1-V3 between the first gain Gr1-V1 and the second gain Gr1-V2.

The multiplication unit 193 calculates a reaction force gain Gr1 by multiplying the reaction force gain Gr1-C by the reaction force gain Gr1-V.

The filtering unit 194 is provided for suppressing a sudden change in the reaction force gain Gr1. That is, when the reaction force gain Gr1 is switched according to the result of the abnormality determination process, the filtering unit 194 gradually changes the reaction force gain Gr1. For example, the filtering unit 194 includes a low pass filter and applies the low pass filter to the reaction force gain Gr1.

The multiplication unit 195 calculates the first reaction force control amount FB1 by multiplying a base reaction force control amount FB0 by the reaction force gain Gr1 (FB1=Gr1×FB0).

Figure 10:
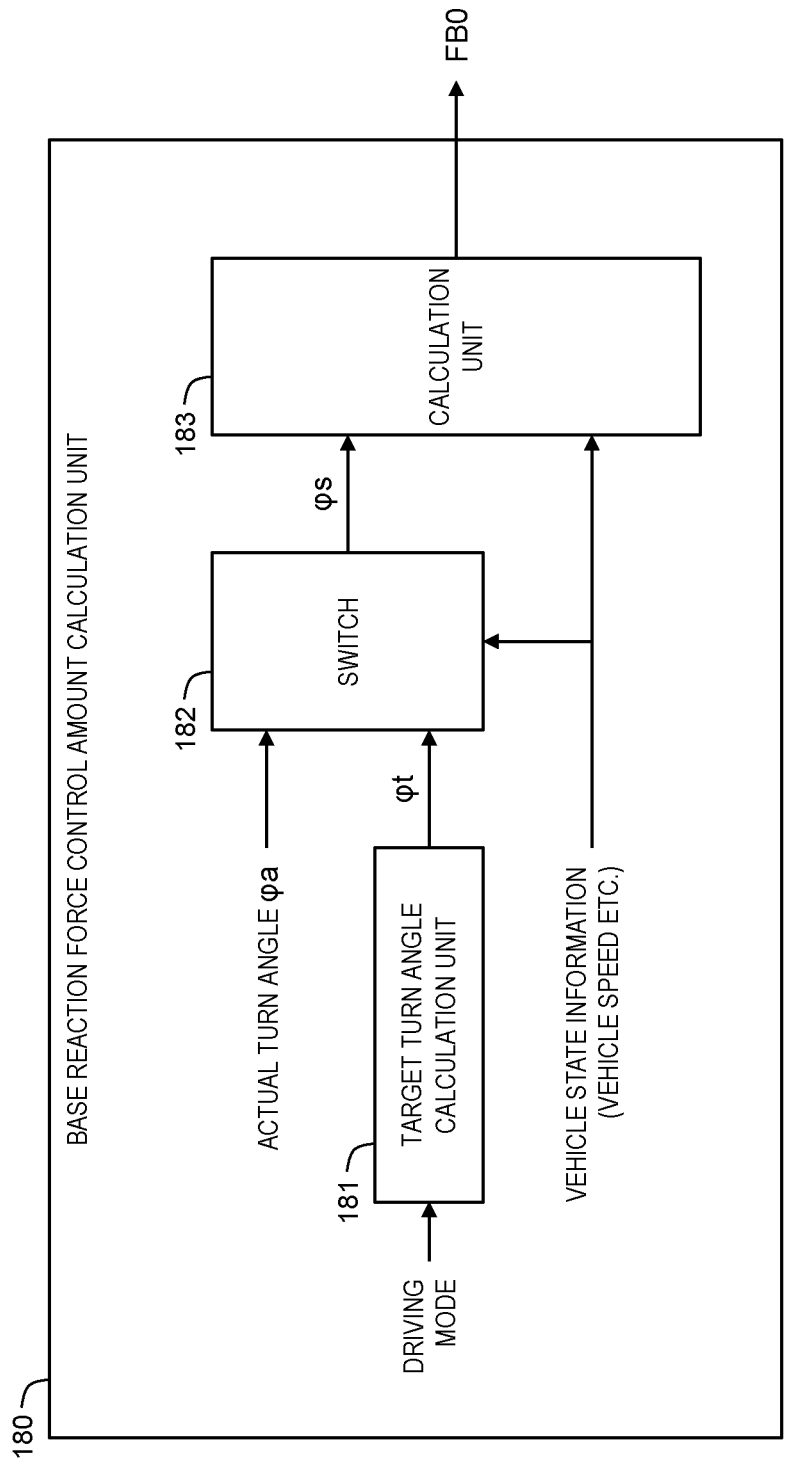
FIG. 10 is a block diagram showing a functional configuration example of a base reaction force control amount calculation unit in a vehicle according to an embodiment of the present embodiment.

The base reaction force control amount FB0 is calculated by the base reaction force control amount calculation unit 180. FIG. 10 is a block diagram showing a functional configuration example of the base reaction force control amount calculation unit 180. The base reaction force control amount calculation unit 180 includes a target turn angle calculation unit 181, a switch 182, and a calculation unit 183.

The target turn angle calculation unit 181 calculates a target turn angle φt of the vehicle 100. Here, the turn angle means a turn angle of a wheel of the vehicle 100 and corresponds to a pinion angle, a motor angle, the steering angle of the steering wheel, or the like.

For example, the target turn angle calculation unit 181 calculates the target turn angle φt based on a driving mode of the vehicle 100. During the remote operation of the vehicle 100, the target turn angle calculation unit 181 calculates the target turn angle φt according to the operation amount indicated by the remote operation information OPE. During the autonomous driving of the vehicle 100, the target turn angle calculation unit 181 calculates the target turn angle φt required for the autonomous driving control. When the autonomous driving and the remote operation are performed concurrently, the target turn angle calculation unit 181 may combine the target turn angle φt depending on the operation amount by the remote operator O and the target turn angle φt required for the autonomous driving control. During emergency control, the target turn angle calculation unit 181 may calculate the target turn angle φt for the emergency control.

An actual turn angle φa is an actual turn angle of the wheel of the vehicle 100. The actual turn angle φa is detected by the vehicle state sensor and is obtained from the vehicle state information.

The switch 182 selects one of the actual turn angle φa and the target turn angle φt as a selected turn angle φs.

The calculation unit 183 calculates the base reaction force control amount FB0 based on the selected turn angle φs, the vehicle speed, and the like. Typically, the base reaction force control amount FB0 increases as the selected steered angle φs increases.

For example, the selected turn angle φs is selected in consideration of disturbance. For example, when crosswind blows during traveling on a highway, control of the steering wheel may be affected. In order to prevent such a sense of disturbance from being transmitted to the remote operator O, the target turn angle φt may be selected instead of the actual turn angle φa. To that end, the switch 182 detects presence or absence of the disturbance based on the vehicle state information. More specifically, the vehicle state information includes the vehicle speed, the steering angle, and the actual lateral acceleration of the vehicle 100. A target lateral acceleration is calculated based on the vehicle speed and the steering angle. When a difference between the actual lateral acceleration and the target lateral acceleration exceeds a threshold value, it is determined that there is the disturbance such as the crosswind. In this case, the switch 182 selects not the actual turn angle φa but the target turn angle φt as the selected turn angle φs.

As described above, the base reaction force control amount calculation unit 180 calculates the base reaction force control amount FB0. The reaction force control amount calculation unit 190 sets the reaction force gain Gr1 according to the result of the abnormality determination process. Further, the reaction force control amount calculation unit 190 calculates the first reaction force control amount FB1 by multiplying the base reaction force control amount FB0 by the reaction force gain Gr1 (FB1=Gr1×FB0). The first reaction force control amount FB1 thus calculated is fed back to the remote operator terminal 200 as a part of the vehicle information VCL.

4. Examples of Remote Operator Terminal 4-1. Configuration Example

Figure 11:
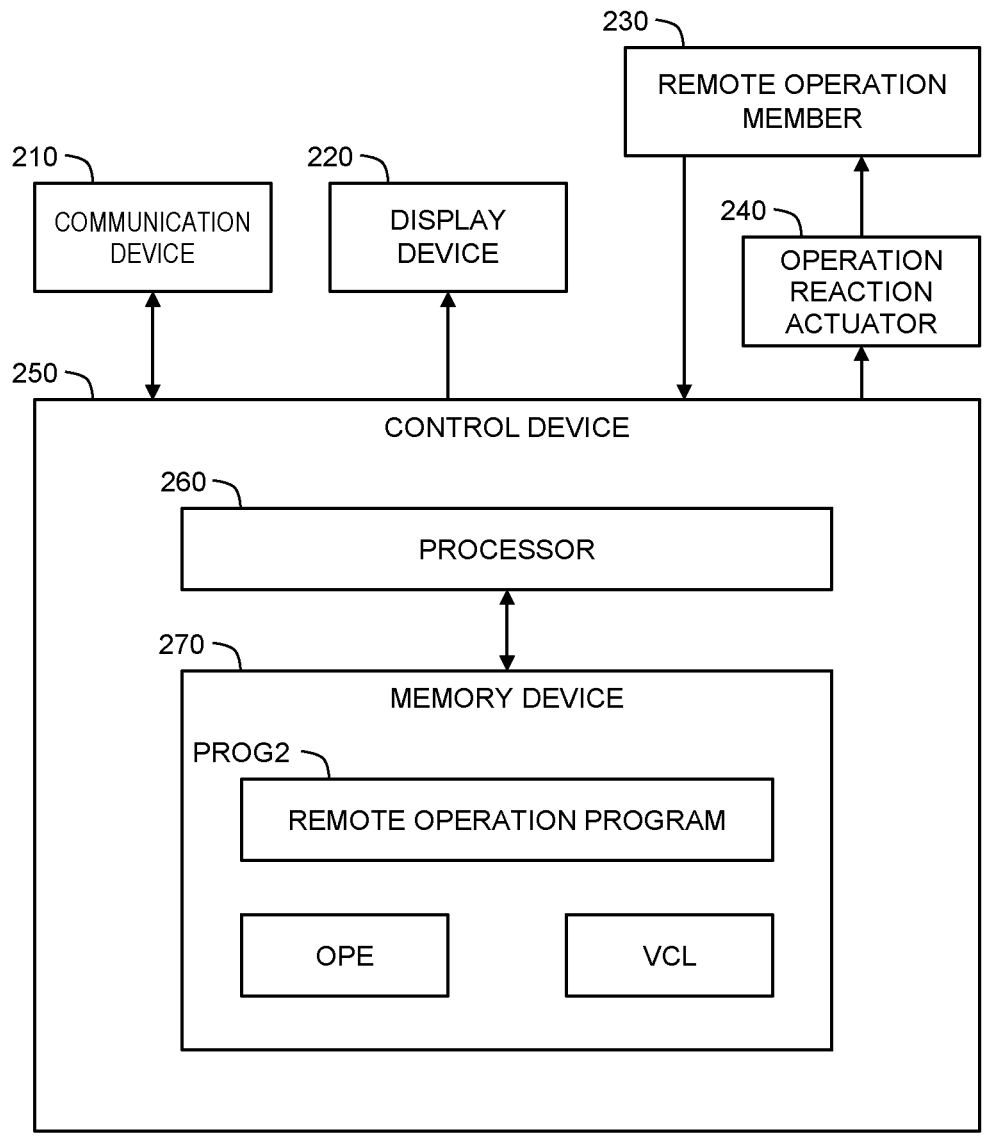
FIG. 11 is a block diagram showing a configuration example of a remote operator terminal according to an embodiment of the present disclosure.

FIG. 11 is a block diagram showing a configuration example of the remote operator terminal 200. The remote operator terminal 200 includes a communication device 210, a display device 220, the remote operation member 230, the operation reaction actuator 240, and a control device (controller) 250.

The communication device 210 communicates with the vehicle 100 and the management device 300.

The display device 220 presents a variety of information to the remote operator O by displaying the variety of information.

The remote operation member 230 is a member operated by the remote operator O when remotely operating the vehicle 100. The remote operation member 230 includes a steering wheel, an accelerator pedal, a brake pedal, a direction indicator, and the like.

The operation reaction actuator 240 applies an operation reaction force to the remote operation member 230. For example, the operation reaction actuator 240 includes a reaction motor that applies a steering reaction force (steering reaction torque) to the steering wheel. A rotor of the reaction motor is connected to the steering wheel through a speed reducer. Rotation of the reaction motor makes it possible to apply the steering reaction force to the steering wheel. An operation of the operation reaction actuator 240 is controlled by the control device 250.

The control device 250 controls the remote operator terminal 200. The control device 250 includes one or more processors 260 (hereinafter simply referred to as a processor 260) and one or more memory devices 270 (hereinafter simply referred to as a memory device 270). The processor 260 executes a variety of processing. For example, the processor 260 includes a CPU. The memory device 270 stores a variety of information necessary for the processing by the processor 260. Examples of the memory device 270 include a volatile memory, a non-volatile memory, an HDD, an SSD, and the like.

A remote operation program PROG2 is a computer program executed by the processor 260. The functions of the control device 250 are implemented by the processor 260 executing the remote operation program PROG2. The remote operation program PROG2 is stored in the memory device 270. The remote operation program PROG2 may be recorded on a non-transitory computer-readable recording medium. The remote operation program PROG2 may be provided via a network.

The control device 250 communicates with the vehicle 100 via the communication device 210. The control device 250 receives the vehicle information VCL transmitted from the vehicle 100. The control device 250 presents the vehicle information VCL to the remote operator O by displaying the vehicle information VCL including the image information on the display device. The remote operator O is able to recognize the state of the vehicle 100 and the situation around the vehicle 100 based on the vehicle information VCL displayed on the display device.

The remote operator O operates the remote operation member 230. An operation amount of the remote operation member 230 is detected by a sensor installed on the remote operation member 230. The control device 250 generates the remote operation information OPE reflecting the operation amount of the remote operation member 230 operated by the remote operator O. Then, the control device 250 transmits the remote operation information OPE to the vehicle 100 via the communication device 210.

4-2. Abnormality Determination Process and Abnormality Notification Process

Figure 12:
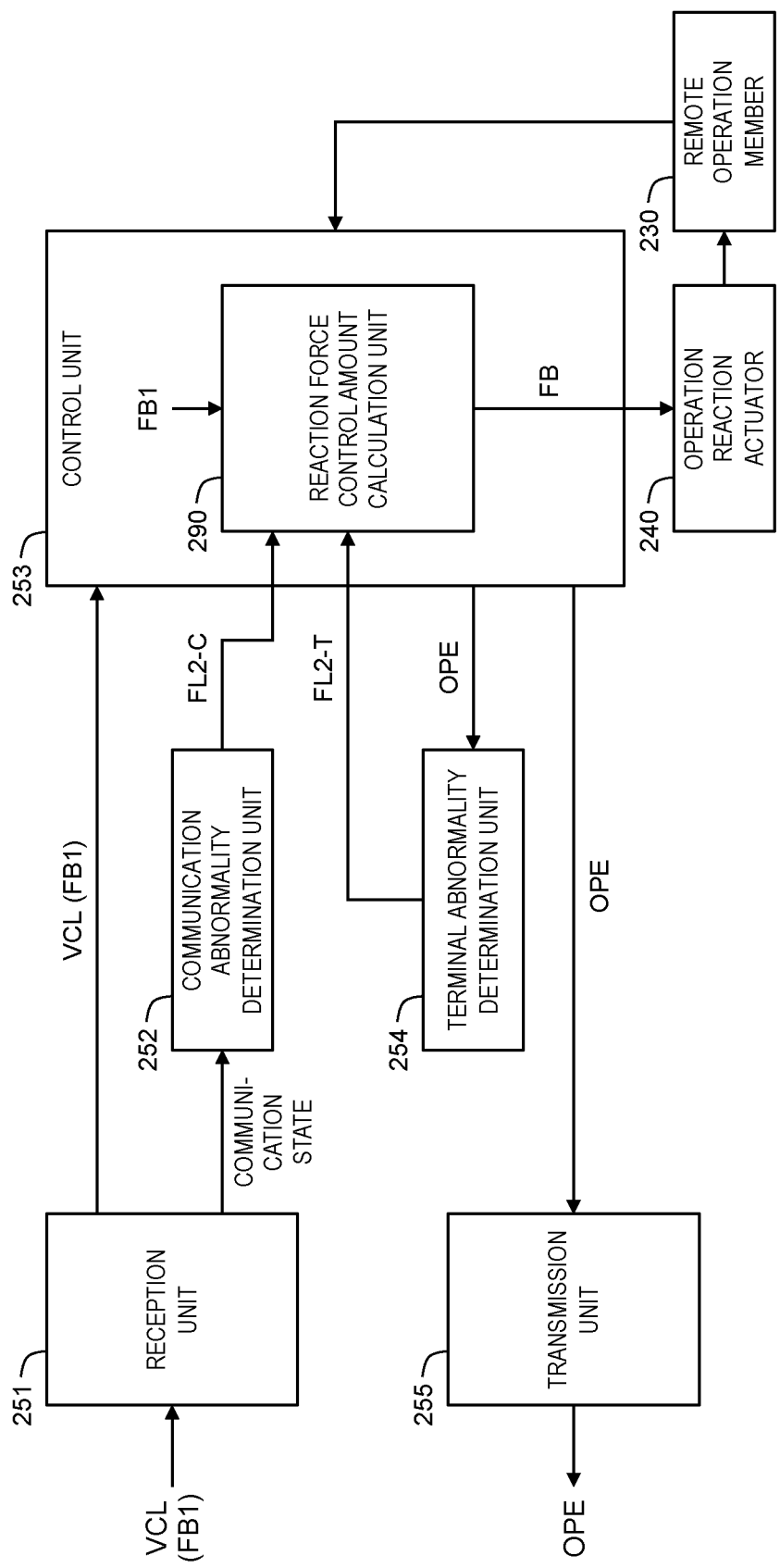
FIG. 12 is a block diagram for explaining an abnormality determination process and an abnormality notification process in a remote operator terminal according to an embodiment of the present disclosure.

FIG. 12 is a block diagram for explaining the abnormality determination process and the abnormality notification process in the remote operator terminal 200. The remote operator terminal 200 includes, as functional blocks, a reception unit 251, a communication abnormality determination unit 252, a control unit 253, a terminal abnormality determination unit 254, and a transmission unit 255. These functional blocks are realized by the communication device 210 and the control device 250.

The reception unit 251 receives information transmitted from the vehicle 100 during the remote operation of the vehicle 100. The information transmitted from the vehicle 100 includes the vehicle information VCL described above. The reception unit 251 grasps a state of the communication with the vehicle 100 based on the received information. Examples of the communication state include presence or absence of data reception, a delay amount, a transmission speed, a radio wave reception intensity, and the like.

The communication abnormality determination unit 252 performs a "communication abnormality determination process." More specifically, the communication abnormality determination unit 252 acquires information on the communication state from the reception unit 251. Then, the communication abnormality determination unit 252 determines, based on the communication state, whether or not an abnormality occurs in the communication from the vehicle 100 to the remote operator terminal 200. A specific example of the communication abnormality determination process is the same as that shown in FIGS. 6 and 7 described above.

A communication abnormality flag FL2-C is information indicating a result of the communication abnormality determination process. When it is determined that no communication abnormality occurs, that is, when no communication abnormality is detected, the communication abnormality flag FL2-C is set to, for example, "0." On the other hand, when it is determined that a communication abnormality occurs, that is, when a communication abnormality is detected, the communication abnormality flag FL2-C is set to, for example, "1." The communication abnormality determination unit 252 outputs the communication abnormality flag FL2-C.

The control unit 253 receives the vehicle information VCL and the abnormality flag (FL2-C, FL2-T). The control unit 253 presents the vehicle information VCL to the remote operator O. Moreover, the control unit 253 outputs the remote operation information OPE. Further, when the abnormality flag indicates the abnormality detection, the control unit 253 notifies the remote operator O of the occurrence of the abnormality.

The terminal abnormality determination unit 254 performs a "terminal abnormality determination process." More specifically, the terminal abnormality determination unit 254 receives the remote operation information OPE output from the control unit 253. Then, the terminal abnormality determination unit 254 determines, based on the remote operation information OPE, whether or not an abnormality occurs in the remote operator terminal 200. A specific example of the terminal abnormality determination process will be described later (see Section 4-3).

A terminal abnormality flag FL2-T is information indicating a result of the terminal abnormality determination process. When it is determined that no terminal abnormality occurs, that is, when the terminal abnormality is not detected, the abnormality flag FL2-T is set to, for example, "0." On the other hand, when it is determined that a terminal abnormality occurs, that is, when a terminal abnormality is detected, the terminal abnormality flag FL2-T is set to, for example, "1." The terminal abnormality determination unit 254 outputs the terminal abnormality flag FL2-T.

The transmission unit 255 transmits the remote operation information OPE output from the control device 253 to the vehicle 100.

4-3. Example of Terminal Abnormality Determination Process

Figure 13:
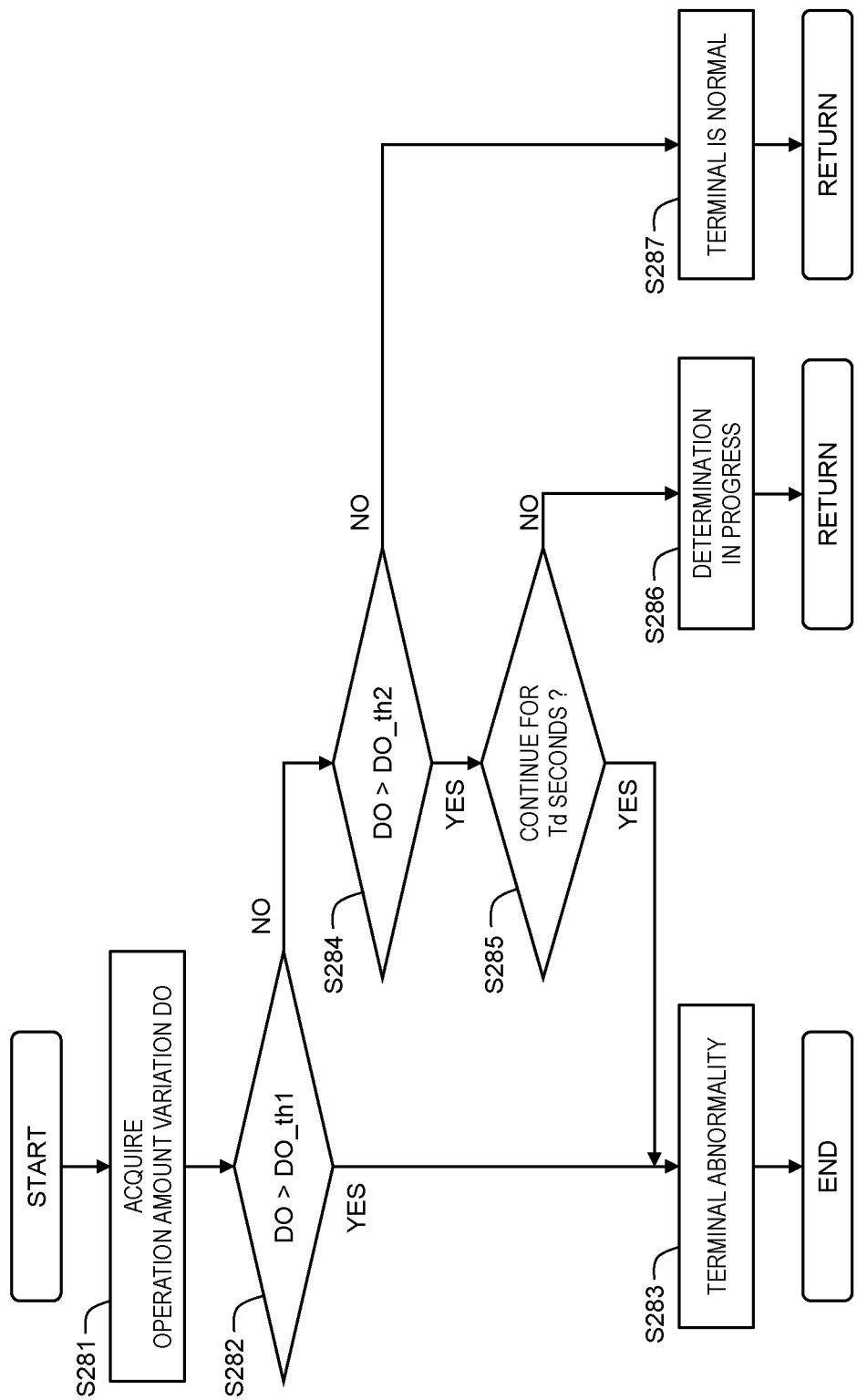
FIG. 13 is a flowchart showing an example of a terminal abnormality determination process according to an embodiment of the present disclosure.

FIG. 13 is a flowchart showing an example of the terminal abnormality determination process performed by the terminal abnormality determination unit 254.

In Step S281, the terminal abnormality determination unit 254 receives the remote operation information OPE. Then, the terminal abnormality determination unit 254 acquires an "operation amount variation DO" that is a variation from a previous value of the operation amount by the remote operator O.

In Step S282, the terminal abnormality determination unit 254 determines whether or not the operation amount variation DO exceeds a first threshold value DO_th1. The first threshold value DO_th1 is an operation amount variation DO where it can be determined that the terminal abnormality occurs. For example, the first threshold value DO_th1 is an operation amount variation DO that cannot normally occur. When the operation amount variation DO exceeds the first threshold value DO_th1 (Step S282; Yes), the processing proceeds to Step S283. On the other hand, when the operation amount variation DO is equal to or less than the first threshold value DO_th1 (Step S282; No), the processing proceeds to Step S284.

In Step S283, the terminal abnormality determination unit 254 determines (asserts) that the terminal abnormality occurs.

In Step S284, the terminal abnormality determination unit 254 determines whether or not the operation amount variation DO exceeds a second threshold value DO_th2. The second threshold value DO_th2 is smaller than the first threshold value DO_th1 described above. For example, the second threshold value DO_th2 is an upper limit value of an allowable range of the operation amount variation DO. When the operation amount variation DO exceeds the second threshold value DO_th2 (Step S284; Yes), the processing proceeds to Step S285. On the other hand, when the operation amount variation DO is equal to or less than the second threshold value DO_th2 (Step S284; No), the processing proceeds to Step S287.

In Step S285, the terminal abnormality determination unit 254 determines whether or not the state in which the operation amount variation DO exceeds the second threshold value DO_th2 continues for Td seconds. When such the state continues for Td seconds (Step S285; Yes), the processing proceeds to Step S283. On the other hand, when such the state has not yet continued for Td seconds (Step S285; No), the processing proceeds to Step S286.

In Step S286, the terminal abnormality determination unit 254 sets the current state to "terminal abnormality determination in progress" without confirming the determination. After that, the processing returns to Step S281.

In Step S287, the terminal abnormality determination unit 254 determines that no terminal abnormality occurs and the remote operator terminal 200 is normal. After that, the processing returns to Step S281.

4-4. Example of Reaction Force Control Amount Calculation Process

As shown in the foregoing FIG. 12, the control unit 253 includes a reaction force control amount calculation unit 290. The reaction force control amount calculation unit 290 calculates the "reaction force control amount FB" for generating the operation reaction force.

Figure 14:
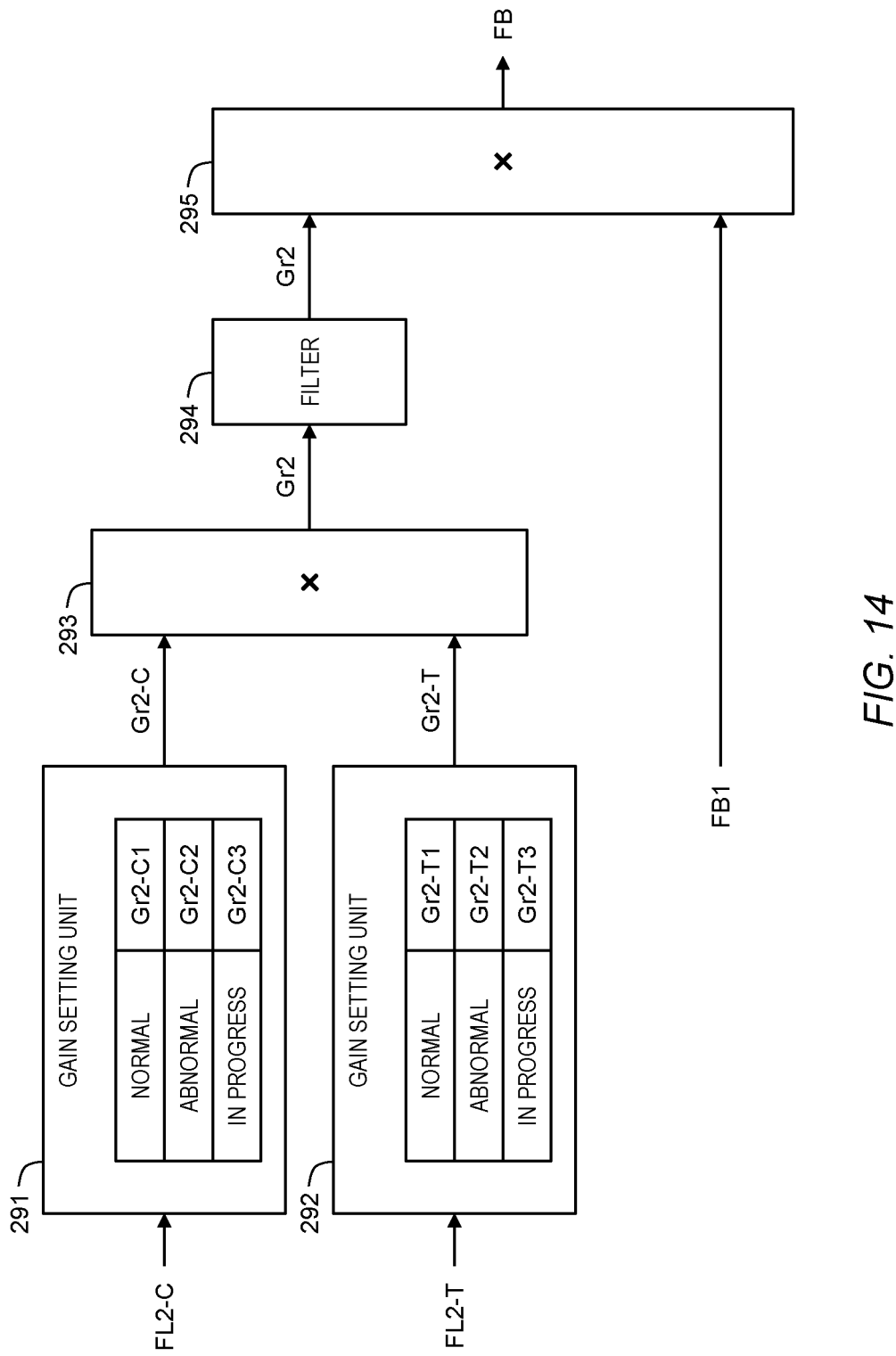
FIG. 14 is a block diagram showing a functional configuration example of a reaction force control amount calculation unit in a remote operator terminal according to the present embodiment.

FIG. 14 is a block diagram showing a functional configuration example of the reaction force control amount calculation unit 290. The reaction force control amount calculation unit 290 includes a gain setting unit 291, a gain setting unit 292, a multiplication unit 293, a filtering unit 294, and a multiplication unit 295.

The gain setting unit 291 performs a gain setting process that sets a reaction force gain Gr2-C. More specifically, the gain setting unit 291 sets the reaction force gain Gr2-C based on the communication abnormality flag FL2-C indicating the result of the communication abnormality determination process by the communication abnormality determination unit 252. For example, when it is determined that no communication abnormality occurs, the gain setting unit 291 sets the reaction force gain Gr2-C to a first gain Gr2-C1. When it is determined that the communication abnormality occurs, the gain setting unit 291 sets the reaction force gain Gr2-C to a second gain Gr2-C2 larger than the first gain Gr2-C1. In a period of the communication abnormality determination in progress, the gain setting unit 291 may set the reaction force gain Gr2-C to a third gain Gr2-C3 between the first gain Gr2-C1 and the second gain Gr2-C2.

The gain setting unit 292 performs a gain setting process that sets a reaction force gain Gr2-T. More specifically, the gain setting unit 292 sets the reaction force gain FL2-T based on the terminal abnormality flag Gr2-T indicating the result of the terminal abnormality determination process performed by the terminal abnormality determination unit 254. For example, when it is determined that no terminal abnormality occurs, the gain setting unit 292 sets the reaction force gain Gr2-T to a first gain Gr2-T1. When it is determined that the terminal abnormality occurs, the gain setting unit 292 sets the reaction force gain Gr2-T to a second gain Gr2-T2 larger than the first gain Gr2-T1. In a period of the terminal abnormality determination in progress, the gain setting unit 292 may set the reaction force gain Gr2-T to a third gain Gr2-T3 between the first gain Gr2-T1 and the second gain Gr2-T2.

The multiplication unit 293 calculates s reaction force gain Gr2 by multiplying the reaction force gain Gr2-C by the reaction force gain Gr2-T.

The filtering unit 294 is provided for suppressing a sudden change in the reaction force gain Gr2. That is, when the reaction force gain Gr2 is switched according to the result of the abnormality determination process, the filtering unit 294 gradually changes the reaction force gain Gr2. For example, the filtering unit 294 includes a low pass filter and applies the low pass filter to the reaction force gain Gr2.

The multiplication unit 295 receives the first reaction force control amount FB1 fed back from the vehicle 100 side. Then, the multiplication unit 295 calculates the reaction force control amount FB by multiplying the first reaction force control amount FB1 by the reaction force gain Gr2 (FB=Gr2×FB1=Gr1×Gr2×FB0).

The control unit 253 controls the operation reaction actuator 240 according to the reaction force control amount FB calculated by the reaction force control amount calculation unit 290. As a result, the operation reaction force according to the reaction force control amount FB is applied to the remote operation member 230. The remote operator O operating the remote operation member 230 feels the operation reaction force applied to the remote operation member 230.

What is claimed is:

1. A remote operation system comprising:
   a moving body being a target of a remote operation performed by a remote operator;
   a remote operator terminal on a side of the remote operator; and
   one or more processors included in at least one of the moving body and the remote operator terminal, wherein
   the one or more processors are configured to:
      determine whether or not an abnormality in the remote operator terminal occurs;
      set a gain to be larger when the abnormality occurs than when no abnormality occurs; and
      calculate a reaction force control amount by multiplying a base reaction force control amount by the gain, and
   the remote operator terminal is configured to apply an operation reaction force according to the reaction force control amount to a remote operation member operated by the remote operator.

2. A remote operation system comprising:
   a moving body being a target of a remote operation performed by a remote operator;
   a remote operator terminal on a side of the remote operator; and
   one or more processors included in at least one of the moving body and the remote operator terminal, wherein
   the one or more processors are configured to:
      determine whether or not at least one of an abnormality in a communication between the moving body and the remote operator terminal, an abnormality in the moving body, and an abnormality in the remote operator terminal occurs;

set a gain to be larger when the abnormality occurs than when no abnormality occurs; and calculate a reaction force control amount by multiplying a base reaction force control amount by the gain, the remote operator terminal is configured to apply an operation reaction force according to the reaction force control amount to a remote operation member operated by the remote operator, and the setting the gain includes:
setting the gain to a first gain when it is determined that no abnormality occurs;

setting the gain to a second gain larger than the first gain when it is determined that the abnormality occurs; and setting the gain to a third gain between the first gain and the second gain in a period from when possibility of occurrence of the abnormality is detected to when whether or not the abnormality occurs is determined.

3. The remote operation system according to claim 2, wherein
the one or more processors are configured to determine whether or not the abnormality occurs in the communication between the moving body and the remote operator terminal.

4. The remote operation system according to claim 2, wherein
the one or more processors are configured to determine whether or not the abnormality occurs in the moving body.

5. The remote operation system according to claim 2, wherein
the one or more processors are configured to determine whether or not the abnormality occurs in the remote operator terminal.

6. An abnormality notification method in a remote operation system,
the remote operation system comprising:
a moving body being a target of a remote operation performed by a remote operator; and
a remote operator terminal on a side of the remote operator,
the abnormality notification method comprising:
determining whether or not an abnormality in the remote operator terminal occurs;
setting a gain to be larger when the abnormality occurs than when no abnormality occurs;
calculating a reaction force control amount by multiplying a base reaction force control amount by the gain; and
applying an operation reaction force according to the reaction force control amount to a remote operation member operated by the remote operator.

7. The abnormality notification method according to claim 6, wherein
the setting the gain includes:
setting the gain to a first gain when it is determined that no abnormality occurs;

setting the gain to a second gain larger than the first gain when it is determined that the abnormality occurs; and setting the gain to a third gain between the first gain and the second gain in a period from when possibility of occurrence of the abnormality is detected to when whether or not the abnormality occurs is determined.

* * * * *